July 15, 1952  M. BONTEMPS  2,603,043
GAUGE CONTROLLED GRINDING WHEEL FEED MECHANISM
Filed May 5, 1948  2 SHEETS—SHEET 1

INVENTOR:
Marcel Bontemps
By: John T. Graham
His Agent

July 15, 1952 M. BONTEMPS 2,603,043
GAUGE CONTROLLED GRINDING WHEEL FEED MECHANISM
Filed May 5, 1948 2 SHEETS—SHEET 2

INVENTOR:
Marcel Bontemps
By John F. Graham
His Agent

Patented July 15, 1952

2,603,043

UNITED STATES PATENT OFFICE 2,603,043

GAUGE CONTROLLED GRINDING WHEEL FEED MECHANISM

Marcel Bontemps, Villeurbanne, France, assignor to Societe a Responsabilite Limitee dite: Etablissements Gendron Freres, Villeurbanne, France Application May 5, 1948, Serial No. 25,286
In France July 18, 1947

3 Claims. (Cl. 51—165)

The present invention relates to a grinding apparatus which automatically permits the work pieces to be ground to the required dimensions whenever the machining has caused a continuous variation of the dimensions, especially when cylindrical pieces are ground by positive action grinding machines. This operation is generally carried out on semi automatic machines, the stopping for the removal of metal being either left to the worker's own initiative, the latter observing by means of a calipering device, the decrease in diameter of the piece. The stopping may also be achieved by a fixed stop which prevents the grinder carriage from moving.

On the contrary, in the machine fitted with the device according to the invention, the intervention of the worker is reduced to the actuation of the lever controlling the starting of the automatic approaching movement of the grinder carriage. This action causes the following cycle:

Fast approach of the grinder carriage, followed by the placement of the measuring feeler into working position.

Slow approach of the grinder carriage and removal of metal.

Stopping the slow approach when the desired dimension is attained.

Stationary position of the grinder carriage during an adjustable period of time, corresponding to "surfacing time".

Swift backward movement of the grinder carriage

Withdrawal of the measuring feeler.

In order to carry this out, the device according to the invention comprises essentially, so as to caliper accurately the diameter of the work piece, a V-shaped feeler, the measuring contact of which, by its appropriate amplified movements, controls an electrical circuit in a manner such that the latter will be closed when the diameter of the piece reaches the required dimensions. This circuit comprises the coil of a double switch which stops the advancing movement of the grinder carriage through the medium of appropriate devices. During the time when the grinder carriage is idle, metal is still being removed, but at a very reduced speed. The diameter of the piece continues therefore to decrease. When the required dimension is reached, the corresponding movement of the feeler contact provokes the operation of a single switch which switches on an electromagnet designed to cause the retraction of the grinder carriage and of the feeler.

Moreover, the feeler is placed on a support, the position of which is related to that of the grinder carriage, so that the feeler is in contact with the piece when the grinder carriage is in working position and is withdrawn when the grinder carriage is in the idle position.

The appended drawings illustrate, as a nonlimitative example, the embodiment of the invention for an automatically controlled grinding machine, equipped for positive operation.

Figure 1:
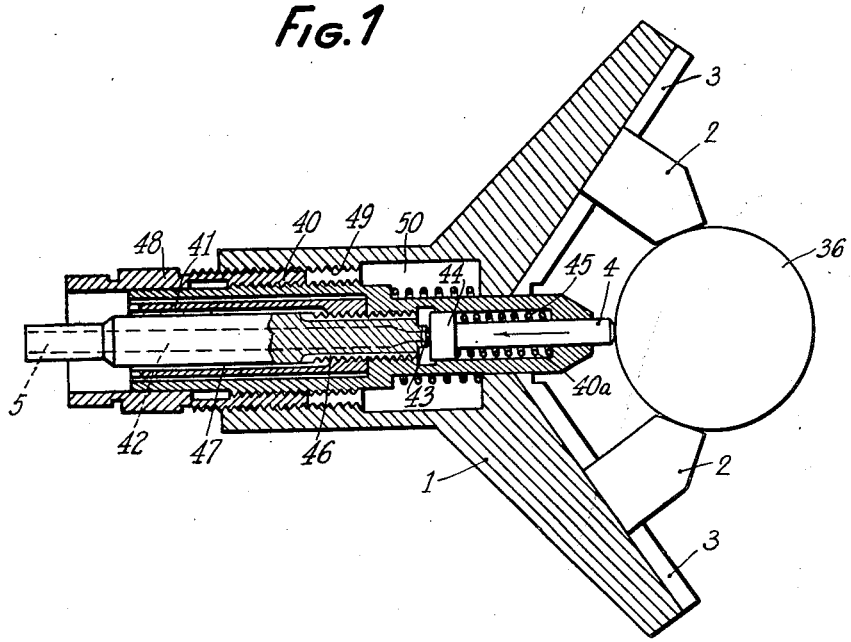
Fig. 1 shows a view of the adjustable V-shaped feeler fitted with a pneumatic amplifier.

In the example shown, in Fig. 1, a feeler assembly is illustrated and includes a V-shaped feeler frame 1 provided with two contact slides 2, made of hard metal, which slide in dovetail sectioned grooves 3, and which include between them an angle such, that by selecting appropriately the position of these slides, a very small variation in the position of the operating rod 4 permits the adjustment of the feeler apparatus for use with workpieces having any desired diameter. The movements of this operating rod 4 by means of any reliable energy medium (pneumatic or the like) and with the interposition of amplifiers, control the operation of the machine.

In the illustrated embodiment, movements of the rod 4 are employed to control the pressure in a line or conduit 5 supplied with a pressure fluid from a suitable source (not shown). The feeler assembly, for this purpose, may be constructed and operated substantially in accordance with the disclosure of United States Letters Patent to M. Mennesson, Patent No. 2,408,672, and preferably includes a hollow body 40 of elongated configuration disposed so that its longitudinal axis bisects the angle between the legs of frame 1. The operating rod 4 is formed with a piston 44 on an end thereof which is slidable within a chamber of body 40. A spring 45 is interposed between the piston 44 and a shoulder 40a at one end of the chamber receiving the piston, to yieldably urge rod 4 and its piston 44 in the direction away from the work 36.

The conduit or pipe 5 is connected to a longitudinally bored member 42 which opens, as at 43, into the chamber containing piston 44. Member 42 is suitably threaded into body 40 and is formed with longitudinal grooves 46 on its outer threaded surface which open at the opposite ends into the chamber containing piston 44 and into an annular space 47 opening to the atmosphere and provided between member 42 and a sleeve 41 extending therearound. It will be noted that body 40 is carried within a threaded outer sleeve 48 which engages suitable threads 49 formed in the interior surface of a recess 50 in frame 1 so that the extension of body 40 into the space between the legs of frame 1 may be varied by rotation of outer sleeve 48 thereby adapting the feeler assembly to control the grinding of work of different diameters.

As seen in Fig. 1, spring 45 urging rod 4 to a position retracted within body 40 also urges the piston 44 against the open end 43 of the bore in member 42 which is connected to conduit 5. However, the pressurized fluid in conduit 5 and bore of member 42 tends to displace piston 44 away from open end 43, against the action of spring 45, so that the pressurized fluid may escape to atmosphere through the grooves 46 and annular space 47. In the absence of any restraint being imposed upon movement of piston 44, other than the force of spring 45, piston 44 will act as a pressure relief valve to determine or regulate the pressure in conduit 5. However, when the work 36 being ground contacts the rod 4, the latter is urged in the direction of the arrow in Fig. 1 so that piston 44 operates to reduce the effective size of opening 43 for increasing the pressure in conduit 5 in accordance with the progressive displacement of rod 4 responsive to reduction in diameter of the work 36.

Figure 2:
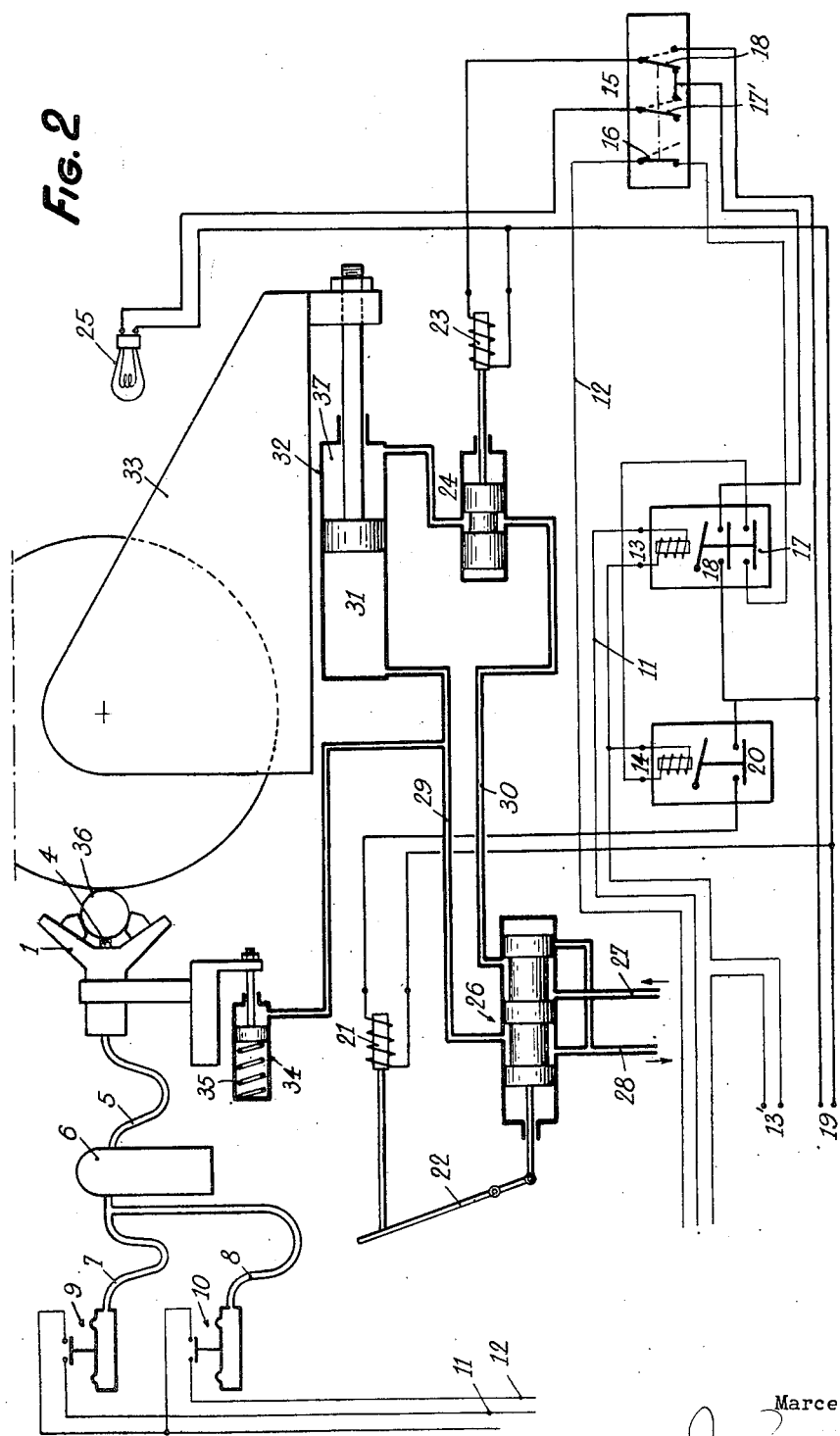
Fig. 2 shows a diagram of the complete installation on the machine-tool.

In the diagram of Fig. 2, the conduit 5 is shown extending to a pressure amplifier 6 which is of conventional construction serving to amplify the pressure variations produced in the conduit 5 by movements of the operating rod 4 and through conduits 7, 8, is connected to pressure responsive switches 9, 10 to subject the latter to the amplified pressure variations. The pressure amplifier, by way of example, may include a differential piston (not shown), that is, a piston having different areas on its opposite faces, with the pressure in conduit 5 being imposed against the face of larger area and the face of smaller area acting against a fluid in a closed circuit including the conduits 7 and 8. Further, the switches 9 and 10 are conventional pressure responsive switches and, as illustrated, may each include a flexible walled chamber, for example, a container having a flexible membrane forming a wall thereof, having a movable bridging contact mounted thereon and a pair of fixed contacts which are bridged by the movable contact when the flexible walled chamber is distended sufficiently by a predetermined pressure therein. In the present embodiment, the flexibility of the flexible walled chambers or the normal spacing between the fixed and movable contacts of the switches 9 and 10 are different so that as the pressure in conduit 5 progressively increases, bringing about corresponding changes in the pressure in conduits 7 and 8, the switch 9 will first close and, at a further elevated pressure, the switch 10 will close. These switches 9, 10 control two electrical circuits 11, 12 which, starting from a common power supply 13' are respectively adapted to effect the operation of two electromagnetic switches, one of which is a double poled (switch 13) and the other a single poled (switch 14). Switch 13 includes two sets of contacts 17 and 18 and exerts control over two circuits. The first of these circuits, having the contacts 17 interposed therein, is the circuit 12 controlled by pressure responsive switch 10 and extending through a manually operable switch 16 to the coil of electro-magnetically operated switch 14 so that the circuit 12 can only be closed for energizing the coil of switch 14 when switch 13 is simultaneously closed by energization of its coil. The second circuit controlled by contacts 18 of the electro-magnetically operated switch 13 starts at a power supply 19 and proceeds through contacts 18 before splitting into two branches at a fixed contact 15 of a double pole switch having manually movable contacts 17' and 18'. The contact 17' controls the energization of a signal lamp 25, while the contact 18' is interposed in the circuit branch leading to a solenoid 23. The electrical circuits are completed by a circuit extending from the power supply 19, through contacts 20 of the electromagnetically operated switch 14, to a second solenoid 21.

In accordance with the present invention, the above described electrical circuits are provided in association with the following hydraulic system for controlling operation of the grinder or machine tool.

The starting lever 22 acts on the valve device 26, the cylinder of which comprises an inlet conduit 27 and an outlet conduit 28 for oil under pressure. The coupled pistons of this valve device 26 control the conduits 29, 30. The conduit 29 is connected on one hand to the chamber 31 of the cylinder 32, the piston of which is connected to the grinder carriage 33 which is movable toward and away from the work 36, and on the other hand to the cylinder 34 the piston of which, working against a spring 35, when subjected to the oil under pressure causes the feeler 1 to be retracted with respect to the workpiece 36 which is to be trimmed.

The conduit 30 is connected with the fluid flow controlling cylinder 24 which controls the oil feed to the chamber 37 of the cylinder 32, so as to cause the positive movement of the grinder carriage 33.

The installation operates as follows:

When the switch 15 is in the position shown by the solid lines, the machine is in its operating position, the signal lamp 25 is connected directly to the main power supply circuit 19 and is permanently illuminated.

In the operating position, the oil feeding distributor 26 permits oil under pressure to reach the rear chamber 37 of the cylinder 32, while the forward chamber 31 is connected to the exhaust. The grinder therefore moves towards the work piece 36. On the other hand, as it can be seen on the drawing, the cylinder 34, controlling the backward movement of the feeler 1, is also connected to the exhaust. The feeler 1 under the action of the spring 35 presses on to the work piece 36.

When the grinder is in operation, the workpiece 36 undergoes a progressive decrease in diameter and the operating rod 4 is displaced by the workpiece into body 40 causing thereby the air pressure in the conduit 5 and hence in conduits 7 and 8 to progressively increase. For a given value of this pressure, the manometrical switch 9 is closed, thus completing the power supply circuit of the coil of switch 13.

Energization of the coil of switch 13 closes the contacts 18 and 17 thereof to complete the circuit to solenoid 23 which operates slide valve 24, and to condition the power supply circuit of the coil of the switch 14 so that the circuit to the coil of switch 14 may be subsequently completed by closing of the pressure responsive switch 10. The pressure at which pressure responsive switch 9 closes is predetermined to correspond to the position of rod 4 at the completion of the rough grinding or machining phase of the operation. The valve 24, when actuated, closes off the compressed oil feed to the rear chamber 37 of the cylinder 32, stopping thereby the advancing movement of the grinding carriage 33. For a given period of time, the grinder is then kept in contact against the workpiece 36 and its carriage stationary. The piece 36 continues to decrease in diameter at a reduced speed, and the pressure in the conduits 7, 8 continues to increase. For a given value of this further increased pressure, the manometrical switch 10 is actuated, closing thereby the power supply circuit of the coil of switch 14 so that the power supply circuit for solenoid 21 is completed. Solenoid or electro-magnet 21 is connected to the lever 22, and when energized returns the distributor 26 to its withdrawn position. The forward chamber 31 of the cylinder 32 is then hydraulically connected with the pressure oil piping, while line 30 extending to the rear chamber 32 is connected to the exhaust, but the valve 24 blocks line 30 and prevents any movement of the piston in cylinder 32. But, at the same time, the cylinder 35 is put under pressure, causing the feeler 1 to be retracted. The workpiece ceases to be in contact with the feeler thereby resulting in a drop in pneumatic pressure in conduit 5. Thereupon manometrical switch 9 opens the contact which it had previously closed; the switch 13 returns to its open position and the valve 24, under the action of its compressed spring, returns to the open position. With the valve 24 open, nothing now prevents the grinder carriage 33 from moving, and the latter draws back, away from the workpiece 36. Similarly, the manometrical switch 10 opens the circuit of the switch 14 which opens in turn the power supply circuit of the electromagnet 21. The machine is thus ready to accomplish a complete new cycle, which cycle is initiated by manually returning lever 22 to its position illustrated in Fig. 2.

When, on the other hand, the switch 18' is in the position indicated by the dotted lines in Fig. 2, the solenoid 23 is continuously energized and valve 24 is always closed. Therefore, if the lever 22, before the switch 18' was actuated, were in the position corresponding to the retracted movement of the grinder carriage 33, it will be possible to manoeuvre this lever 22 without causing the grinder to advance.

With the valve 24 locking the grinder carriage in its withdrawn or retracted position, the lever 22 may be manipulated to advance the feeler apparatus into contact with a standard workpiece having the desired dimensions for which the machine is to be adjusted. With the switch 17' in its dotted line position, the lamp 25 is illuminated only when switch 13 is closed. Thus, initial setting of the machine can be achieved by adjusting the sleeve 48 of the feeler apparatus until the operating rod 4 contacts the test or standard workpiece and is urged by the latter to a position establishing a pressure in conduit 7 sufficient to close pressure responsive switch 9, such closure of switch 9 being indicated by illumination of lamp 25. The machine will then be set up to grind or otherwise machine a workpiece to the dimensions of the standard or test workpiece in accordance with the operating steps previously described herein.

What I claim is:

1. In combination with a grinding machine including a grinding wheel carriage mounted for movement toward and away from a workpiece, and means for effecting movement of said carriage toward and away from the workpiece; apparatus for feeling the diameter of the workpiece to control the movement of said carriage with respect to the workpiece comprising conduit means for containing a pressure fluid, gauge means mounted for movement between active and retracted positions, means for effecting movement of said gauge means between said active and retracted positions, said gauge means being connected to said conduit means and operative, when in said retracted position, to establish a datum pressure in said conduit means and, when in said active position, to vary the pressure in said conduit means from said datum pressure in accordance with decreasing diameter of the workpiece, first and second pressure responsive switches connected to said conduit means and constructed to be both open in response to said datum pressure and to be closed in response to different respective pressures varying from said datum pressure, a first electro-magnetic relay having double contacts, means controlled by said first pressure responsive switch for energizing said first relay to close said double contacts of the latter when said first pressure responsive switch is closed, a second electro-magnetic relay, means controlled by said second pressure responsive switch and by one of said double contacts of said first relay for energizing said second relay to close the contacts thereof when said second pressure responsive switch is closed and said first relay is simultaneously energized, stopping means connected to said carriage moving means and controlled by the other of said double contacts to stop the movement of said carriage in response to energization of said first relay, and means connected to said carriage moving means and to said gauge moving means and controlled by said second relay to condition said carriage moving means for movement of the carriage away from the workpiece and to condition said gauge moving means for movement of said gauge means to said retracted position in response to energization of said second relay so that said gauge means then establishes the datum pressure in said conduit means to open said first and second pressure responsive switches and de-energize said first and second relays for rendering said stopping means inoperative.

2. The combination according to claim 1; wherein said means for moving the gauge includes a first hydraulic motor spring urged to move said gauge means to said active position and said means for moving the carriage includes a second hydraulic motor; and wherein said means controlled by the second relay includes means for supplying pressure fluid to said first and second hydraulic motors and a first electromagnetically controlled valve means operative in a first position to direct pressure fluid to one end of said second hydraulic motor for producing movement of said carriage toward the workpiece and to permit exhaust of pressure fluid from the other end of said second hydraulic motor and from said first hydraulic motor and, in a second position to direct pressure fluid to said first motor and to said other end of said second motor and to permit exhaust of pressure fluid from said one end of the latter, said first electro-magnetically controlled valve means is connected to said second relay to be disposed in said second position when the latter is energized.

3. The combination according to claim 2;

wherein said stopping means includes a second electro-magnetically controlled valve means interposed between said first valve means and said one end of said second motor, said second valve means being spring urged to a position permitting free flow between said one end of the second motor and said first valve means and operative to block flow therebetween in response to closing of said second contacts of the first relay.

MARCEL BONTEMPS.

REFERENCES CITED

The following references are of record in the file of this patent:

UNITED STATES PATENTS

| Number | Name | Date |
|---|---|---|
| 2,001,447 | Balsiger | May 14, 1935 |
| 2,102,517 | Crompton | Dec. 14, 1937 |
| 2,102,518 | Johnson | Dec. 14, 1937 |
| 2,201,218 | Balsiger et al. | May 21, 1940 |
| 2,267,391 | Astrowski | Dec. 23, 1941 |
| 2,372,427 | Johnson | Mar. 27, 1945 |
| 2,408,672 | Mennesson | Oct. 1, 1946 |
| 2,504,212 | Mennesson | Apr. 18, 1950 |